United States Patent
Chen et al.

(10) Patent No.: US 12,038,303 B1
(45) Date of Patent: Jul. 16, 2024

(54) VISION-AND-LASER-FUSED 2.5D MAP BUILDING METHOD

(71) Applicant: TONGJI ARTIFICIAL INTELLIGENCE RESEARCH INSTITUTE (SUZHOU) CO. LTD., Suzhou (CN)

(72) Inventors: Hao Chen, Suzhou (CN); Ruoyu Deng, Suzhou (CN)

(73) Assignee: TONGJI ARTIFICIAL INTELLIGENCE RESEARCH INSTITUTE (SUZHOU) CO. LTD., Suzhou (CN)

( * ) Notice: Subject to any disclaimer, the term of this patent is extended or adjusted under 35 U.S.C. 154(b) by 0 days.

(21) Appl. No.: 18/564,231

(22) PCT Filed: Dec. 8, 2021

(86) PCT No.: PCT/CN2021/136356
§ 371 (c)(1),
(2) Date: Nov. 27, 2023

(87) PCT Pub. No.: WO2023/273169
PCT Pub. Date: Jan. 5, 2023

(30) Foreign Application Priority Data

Jun. 30, 2021 (CN) .......................... 202110735175.7

(51) Int. Cl.
*G01C 21/00* (2006.01)
*G06T 7/73* (2017.01)

(52) U.S. Cl.
CPC ...... *G01C 21/3841* (2020.08); *G01C 21/3811* (2020.08); *G06T 7/74* (2017.01);
(Continued)

(58) Field of Classification Search
CPC ... G01C 21/3841; G01C 21/3811; G06T 7/74; G06T 2207/10016; G06T 2207/10024; G06T 2207/10028; G06T 2207/20221
(Continued)

(56) References Cited

U.S. PATENT DOCUMENTS

2019/0273909 A1  9/2019  Ye et al.

FOREIGN PATENT DOCUMENTS

| CN | 111258313 A | 6/2020 |
| CN | 111536964 A | 8/2020 |

(Continued)

OTHER PUBLICATIONS

Guolai Jiang et al., "A Simultaneous Localization and Mapping (SLAM) Framework for 2.5D Map Building Based on Low-Cost LiDAR and Vision Fusion" Appl. Sci. 2019, 9, ISSN: 2076-3417, pp. 4-14 (May 22, 2019).
(Continued)

*Primary Examiner* — Tiffany P Young
(74) *Attorney, Agent, or Firm* — SZDC Law PC

(57) ABSTRACT

A vision-and-laser-fused 2.5D map building method includes: calculating inter-image frame transformation according to an RGB-D image sequence to establish a visual front-end odometer; taking a visual front-end initial estimation as an initial value of scanning matching, and performing laser front-end coarse-grained and fine-grained searches; performing loop closure detection, and performing back-end global optimization on a 2.5D map according to a detected closed loop; and performing incremental update on visual feature dimensions of the 2.5D map, and performing occupation probability update on grid dimensions. The 2.5D map is built using a method of fusing a laser grid and visual features, and compared with a pure laser map and a pure visual map, richness of dimensions is improved, and com-
(Continued)

pleteness of information expression is improved; the 2.5D map building method is not influenced by single sensor failure, and can still stably work in a scenario of sensor degradation.

12 Claims, 3 Drawing Sheets

(52) U.S. Cl.
CPC .............. *G06T 2207/10016* (2013.01); *G06T 2207/10024* (2013.01); *G06T 2207/10028* (2013.01); *G06T 2207/20221* (2013.01)

(58) Field of Classification Search
USPC ........................................................ 701/446
See application file for complete search history.

(56) References Cited

FOREIGN PATENT DOCUMENTS

| CN | 112258600 A | 1/2021 |
|----|-------------|--------|
| CN | 112525202 A | 3/2021 |
| CN | 113624221 A | 11/2021 |
| JP | 2019067215 A | 4/2019 |

OTHER PUBLICATIONS

Yue Xiao "Research on SLAM of robot based on the fusion of LIDAR and Vision" Master's Thesis, Shenzhen Institutes of Advanced Technology, Chinese Academy of Sciences, pp. 27-30, 43 (Jan. 15, 2019).

VISION-AND-LASER-FUSED 2.5D MAP BUILDING METHOD

This application is the National Stage Application of PCT/CN2021/136356, filed on Dec. 8, 2021, which claims priority to Chinese Patent Application No. 202110735175.7, filed on Jun. 30, 2021, which is incorporated by reference for all purposes as if fully set forth herein.

FIELD OF THE DISCLOSURE

The present invention pertains to the field of autonomous map building of mobile robots, and particularly relates to a vision-and-laser-fused 2.5D map building method.

BACKGROUND OF THE DISCLOSURE

With a development of technologies, autonomous mobile robots are applied in more and more scenarios. The autonomous mobile robot is greatly required by industries, such as industrial handling, site inspection, or the like, mainly due to saving of a labor cost and more safety. Perception and adaptation to an environment are premises of autonomous intelligence of the robot, a simultaneous localization and mapping (SLAM) technology is considered as a core link for realizing autonomous navigation, and a series of SLAM technologies with a laser radar and a camera as cores are widely researched and applied. However, frequent handling of cargoes at an industrial site and an unknown environment of a patrolling site present significant challenges to the SLAM technology. In addition, as the robots surge to a service industry, more and more robots are required to work in home environments which are highly dynamic, and walks of persons and random movement of objects require the SLAM technology to be quite stable for stable work of the robots.

In a laser SLAM solution commonly used in an industrial community, scanning matching is performed dependent on accurate initial values in a structured scenario, and a wheel-type odometer usually has low precision, has an accumulated error, and furthermore is difficult to initialize; a visual SLAM solution usually does not have a navigation function and cannot be put into practical use. Sensor fusion is an effective solution for solving single sensor failure, and no solution for fusing stable open-source 2D laser and visual information exists at present.

2.5D maps are three-dimensional abstract descriptions of one or more aspects of reality or a part thereof to a scale based on three-dimensional electronic map databases.

SUMMARY OF THE DISCLOSURE

An object of the present invention is to provide a vision-and-laser-fused 2.5D map building method, which is used for solving a problem of insufficient expression dimensions of an existing map.

In order to achieve the above object, the following technical solution is adopted in the present invention.

A vision-and-laser-fused 2.5D map building method includes:

S1: calculating inter-image frame transformation according to an RGB-D image sequence to establish a visual front-end odometer;

S2: taking a visual front-end initial estimation as an initial value of scanning matching, and performing laser front-end coarse-grained and fine-grained searches;

S3: performing loop closure detection, and performing back-end global optimization on a 2.5D map according to a detected closed loop; and S4: performing incremental update on visual feature dimensions of the 2.5D map, and performing occupation probability update on grid dimensions.

Preferably, in S1, the inter-frame transformation includes:

(1) extracting an ORB feature of each image frame on the time sequence, and establishing a corresponding feature matching relationship; and (2) taking a previous frame as a reference frame, performing PnP calculation on a current frame and the reference frame, building a least square problem according to a minimized reprojection error, and performing iterative optimization solving to obtain inter-frame pose transformation.

Preferably, the least square problem is:

$$\xi^* = \underset{\xi}{\operatorname{argmin}} \frac{1}{2} \sum_{i=1}^{n} \left\| p_i - \frac{1}{s_i} K\exp(\xi^\wedge) P_i \right\|_2^2,$$

wherein
$\xi$ is the camera pose, and
K is a camera internal reference.

Preferably, in S2, the scanning matching includes:

(1) obtaining a pose initial estimation $\xi_0$ according to RGB-D VO; and (2) after a search in a coarse-grained space, reducing a search range, and then searching in a fine-grained space to obtain an optimal pose $\xi^*$.

Preferably, the optimal pose $\xi^*$ is:

$$\xi^* = \underset{\xi \in W}{\operatorname{argmax}} \sum_{k=1}^{K} M(T_\xi h_\xi),$$

wherein
$T_\xi$ is transformation of a scanning point into a map coordinate system,
$h_k$ is a set of scanning points of a laser beam.

Preferably, in S3, the loop closure detection includes:

(1) performing a breadth optimization search within a certain range with a current node as a search center, so as to obtain nodes associated with the current node, generating a data chain using the nodes, performing matching on the current node, and if a response value reaches a set threshold, establishing a constraint $\xi_{ij}$ between the current node and a node in the data chain closest to a centroid of the current node; and (2) in a map building process, taking a certain number of accumulated laser data chains within a certain distance from the current node as the local map, the constraint $\xi_{im}$ between the laser frame and the map being formed between the node and the current local map.

Preferably, in S3, an optimization formula of the back-end global optimization is:

$$\underset{\Pi_s, \xi_m}{\operatorname{argmin}} \frac{1}{2} \left( \sum_{ij} \rho\left(E^2\left(\xi_i, \xi_j; \sum_{ij}, \xi_{ij}\right)\right) + \sum_{i} \rho\left(E^2\left(\xi_i, \xi_m; \sum_{im}, \xi_{im}\right)\right) \right)$$

wherein $E^2\left(\xi_i, \xi_j; \sum_{ij}, \xi_{ij}\right) = e(\xi_i, \xi_j; \xi_{ij})^T \sum_{ij}^{-1} e(\xi_i, \xi_j; \xi_{ij})$, -continued $$e(\xi_i, \xi_j; \xi_{ij}) = \xi_{ij} - \begin{pmatrix} R_{\xi_i}^{-1}(t_{\xi_i} - t_{\xi_j}) \\ \xi_{i;\theta} - \xi_{j;\theta} \end{pmatrix},$$

$$E^2\left(\xi_i, \xi_m; \sum\nolimits_{im}, \xi_{im}\right) = e(\xi_i, \xi_m; \xi_{im})^T \sum\nolimits_{im}^{-1} e(\xi_i, \xi_m; \xi_{im}),$$

$$e(\xi_i, \xi_m; \xi_{im}) = \xi_{im} - \begin{pmatrix} R_{\xi_i}^{-1}(t_{\xi_i} - t_{\xi_m}) \\ \xi_{i;\theta} - \xi_{m;\theta} \end{pmatrix},$$

$$\rho(e) = \begin{cases} \frac{1}{2}e^2, & |e| \leq \delta \\ \delta\left(|e| - \frac{1}{2}\delta\right), & |e| > \delta \end{cases}.$$

Preferably, in S4, the 2.5D map is $M=\{m_{(x,y)}\}$, the 2.5D map includes a laser grid map $M_{grid}=\{m_{g(x,y)}\}$ and a visual feature map $M_{feature}=\{m_{f(x,y)}\}$, and the 2.5D map $M=\{m_{(x,y)}\}$ is:

$$m_{(x,y)} = \{m_{g(x,y)}, m_{f(x,y)}\},$$

$$m_{f(x,y)} = \{f(x,y,z_1), f(x,y,z_2), \ldots, f(x,y,z_n)\},$$

wherein $f(x,y,z)$ is a feature at $(x,y,z)$.

Preferably, an update form of the visual feature dimension is:

$$M_{feature}^{new} = \{M_{feature}^{old}, f_{new}, \xi_f\}.$$

Preferably, the grid dimension includes an unobserved grid and an observed grid, a laser hit probability $p_{hit}$ or $p_{miss}$ is directly given to the unobserved grid, and an update form of the observed grid is:

$$\text{odds}(p) = \frac{p}{1-p}$$

$$M_{grid}^{new}(x) = \text{odds}^{-1}\left(\text{odds}(M_{grid}^{old}(x)) \cdot \text{odds}(p_{hit/miss})\right).$$

Due to application of the above technical solution, compared with a prior art, the present invention has the following advantages.

1. In the present invention, the 2.5D map is built using a method of fusing the laser grid and the visual features, and compared with a pure laser map and a pure visual map, richness of dimensions is improved, and completeness of information expression is improved.

2. The 2.5D map building method according to the present invention is not influenced by single sensor failure, and can still stably work in a scenario of sensor degradation.

3. The 2.5D map building method according to the present invention can avoid a laser initialization process of a positioning and repositioning system, and correct positioning can be quickly and accurately recovered in an error positioning scenario.

DETAILED DESCRIPTION OF PREFERRED EMBODIMENTS

The technical solution of the present invention will be described clearly and completely below with reference to the accompanying drawings, and apparently, the described embodiments are some but not all of the embodiments of the present invention. All other embodiments obtained by a person of ordinary skill in the art based on the embodiments of the present invention without creative efforts fall within the protection scope of the present invention.

Figure 1:
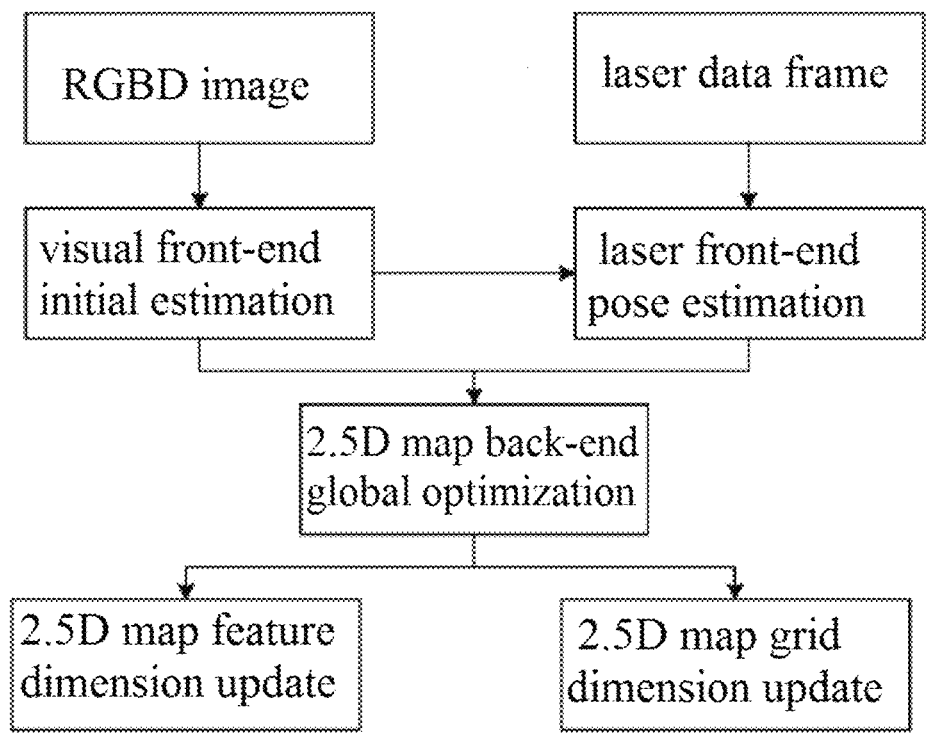
FIG. 1 is a flow chart of a 2.5D map building method according to an embodiment.

As shown in FIG. 1, a vision-and-laser-fused 2.5D map building method includes:

S1: calculating inter-image frame pose transformation according to an RGB-D image sequence to establish a visual front-end odometer, the calculating inter-image frame pose transformation specifically including:

(1) extracting an ORB feature of each image frame on the time sequence, and then establishing a corresponding feature matching relationship, the ORB feature being a feature with rotation invariance, and a feature extraction method being a method in an open-source framework ORB_SLAM; and (2) taking a previous frame as a reference frame, performing perspective-n-point (PnP) calculation on a current frame and the reference frame, building a least square problem according to a minimized reprojection error, and performing iterative optimization solving to obtain inter-frame pose transformation.

In the present embodiment, the PnP problem is solved using a bundle adjustment (BA) method.

Figure 2:
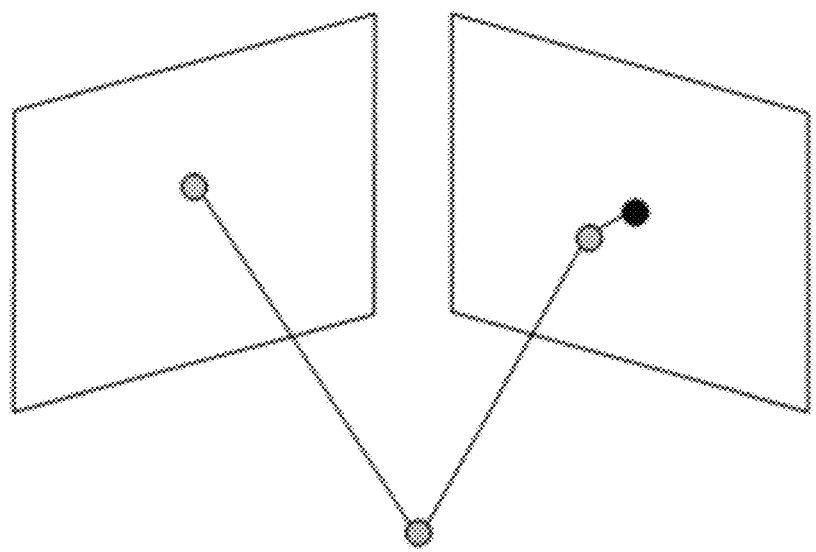
FIG. 2 is a schematic diagram of an RGB-D front-end PnP calculation in the present embodiment.

As shown in FIG. 2, $p_1$ and $p_2$ are a set of points obtained by feature matching, $p_1$ and $p_2$ are projections of a same spatial point P, there exists a distance between the projection $\hat{p}_2$ of P in an initial value and an actual value, an optimal camera pose is required to be found to minimize the error, and therefore, the least square problem is built according to the minimized reprojection error, and an optimization problem is iteratively solved using an LM algorithm; specifically, the least square problem is built according to the minimized reprojection error as:

$$\xi^* = \underset{\xi}{\text{argmin}} \frac{1}{2} \sum_{i=1}^{n} \left\| p_i - \frac{1}{s_i} K \exp(\xi^\wedge) P_i \right\|_2^2,$$

wherein $\xi$ is the camera pose, and $K$ is a camera internal reference.

S2: taking a visual front-end initial estimation as an initial value of scanning matching, and performing laser front-end coarse-grained and fine-grained searches, a scan-to-map matching mode being adopted in laser front-end scanning matching in the present embodiment.

Figure 3:
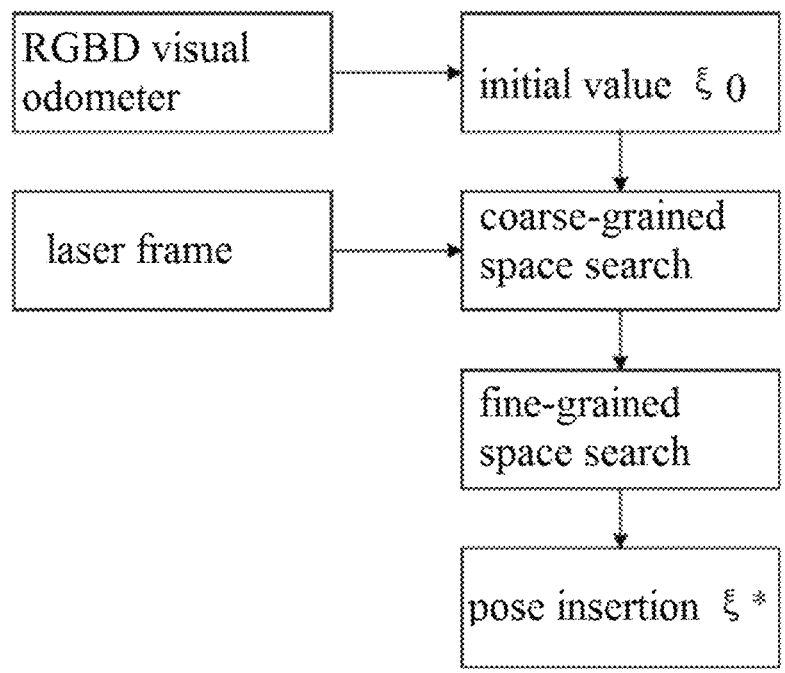
FIG. 3 is a flow chart of front-end scanning matching in the present embodiment.

Specifically, as shown in FIG. 3, in order to obtain an insertion pose between an input laser frame and a local map, the scanning matching includes:

(1) obtaining a pose initial estimation $\xi_0$ according to RGB-D VO; and (2) after a search in a coarse-grained space, reducing a search range, and then searching in a fine-grained space to obtain an optimal pose $\xi^*$, the optimal pose $\xi^*$ being:

$$\xi^* = \underset{\xi \in W}{\mathrm{argmax}} \sum_{k=1}^{K} M(T_\xi h_\xi),$$

wherein $T_\xi$ is transformation of a scanning point into a map coordinate system, $h_k$ is a set of scanning points of a laser beam.

A definition of the search space for the scanning matching is shown as follows:

$$W = \{\xi_0 + (rj_x, rj_y, \delta_\theta j_\theta) : (j_x, j_y, j_\theta) \in \overline{W}\}$$

wherein $$\overline{W} = \{-w_x, \ldots, w_x\} \times \{-w_y, \ldots, w_y\} \times \{-w_\theta, \ldots, w_\theta\},$$

$$w_x = \frac{W_x}{r}, w_y = \frac{W_y}{r}, w_\theta = \frac{W_\theta}{\delta_\theta},$$

$\xi_0$ is obtained by an RGB-D odometer, $\{W_x, W_y, W_\theta\}$ is a search upper and lower bound parameter, $\{r, \delta_\theta\}$ is a step parameter.

Figure 4:
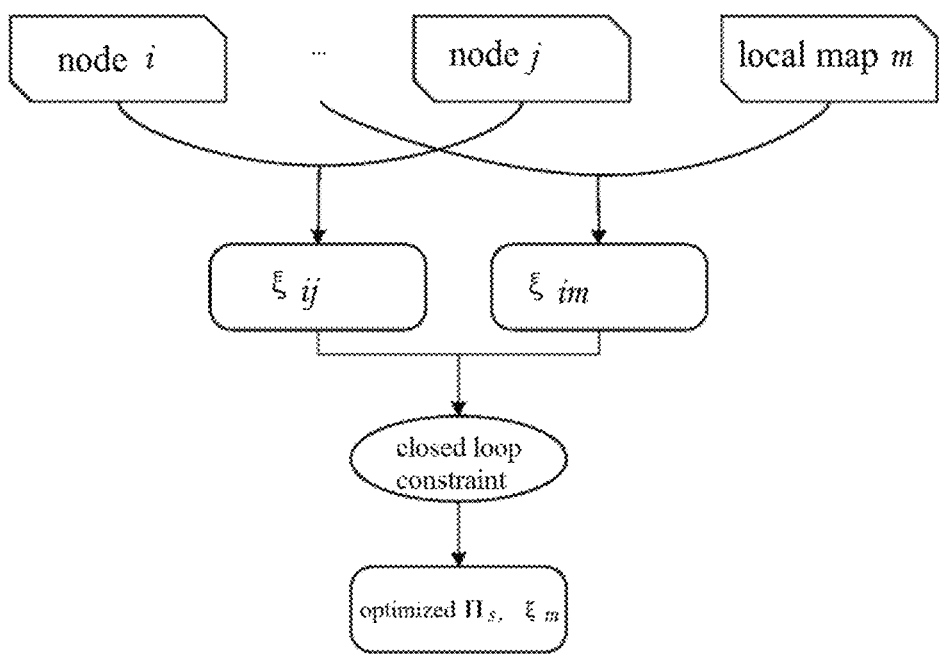
FIG. 4 is a flow chart of back-end global optimization in the present embodiment.

S3: performing loop closure detection, and performing back-end global optimization on a 2.5D map according to a detected closed loop, so as to solve a problem of an accumulated error caused by front-end scanning matching, and prevent a possible interleaving phenomenon of a map established only by a front end, specifically:

the loop closure detection includes a constraint between nodes and a constraint between the nodes and the local map, and as shown in FIG. 4, the loop closure detection includes:

(1) performing a breadth optimization search within a certain range with a current node as a search center, so as to obtain nodes associated with the current node, generating a data chain using the nodes, performing matching on the current node, and if a response value reaches a set threshold, establishing a constraint $\xi_{ij}$ between the current node and a node in the data chain closest to a centroid of the current node; and (2) in a map building process, taking a certain number of accumulated laser data chains within a certain distance from the current node as the local map, the constraint $\xi_{im}$ between the laser frame and the map being formed between the node and the current local map.

An optimization formula of the back-end global optimization is:

$$\underset{\Pi_s, \xi_m}{\mathrm{argmin}} \frac{1}{2} \left( \sum_{ij} \rho \left( E^2 \left( \xi_i, \xi_j; \sum_{ij}, \xi_{ij} \right) \right) + \sum_{i} \rho \left( E^2 \left( \xi_i, \xi_m; \sum_{im}, \xi_{im} \right) \right) \right),$$

wherein $E^2\left(\xi_i, \xi_j; \sum_{ij}, \xi_{ij}\right) = e(\xi_i, \xi_j; \xi_{ij})^T \sum_{ij}^{-1} e(\xi_i, \xi_j; \xi_{ij}),$ $$e(\xi_i, \xi_j; \xi_{ij}) = \xi_{ij} - \begin{pmatrix} R_{\xi_i}^{-1}(t_{\xi_i} - t_{\xi_j}) \\ \xi_{i;\theta} - \xi_{j;\theta} \end{pmatrix},$$

$$E^2\left(\xi_i, \xi_m; \sum_{im}, \xi_{im}\right) = e(\xi_i, \xi_m; \xi_{im})^T \sum_{im}^{-1} e(\xi_i, \xi_m; \xi_{im}),$$

$$e(\xi_i, \xi_m; \xi_{im}) = \xi_{im} - \begin{pmatrix} R_{\xi_i}^{-1}(t_{\xi_i} - t_{\xi_m}) \\ \xi_{i;\theta} - \xi_{m;\theta} \end{pmatrix},$$

$$\rho(e) = \begin{cases} \frac{1}{2} e^2 & , |e| \leq \delta \\ \delta\left(|e| - \frac{1}{2}\delta\right) & , |e| > \delta \end{cases},$$

$\Pi_s = \{\xi_i\}_{i=1,\ldots,n}$ is a node set, $\xi_m$ is a pose of the local map, $\xi_{ij}$ is the constraint between the nodes, and $\xi_{im}$ is the constraint between the node and the local map.

Figure 5:
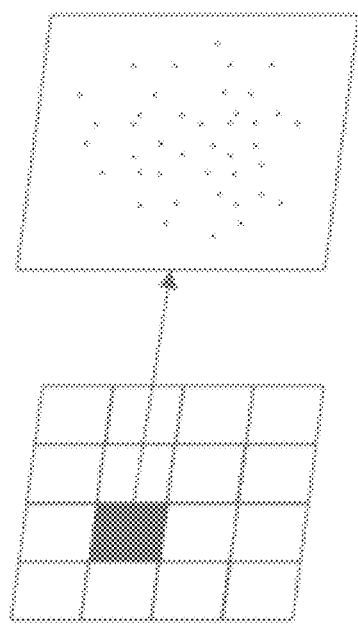
FIG. 5 is a schematic diagram of a 2.5D map structure in the present embodiment.

S4: performing incremental update on visual feature dimensions of the 2.5D map, and performing occupation probability update on grid dimensions, specifically:

the 2.5D map is defined as $M = \{m_{(x,y)}\}$, a structure of the 2.5D map is shown in FIG. 5, a 2.5D map space includes a two-dimensional space occupying a grid plane and a feature dimension space on a corresponding grid point, and therefore, the 2.5D map is divided into a laser grid map $M_{grid}$ and a visual feature map $M_{feature}$ from a perspective of dimension separation, $$M_{grid} = \{m_{g(x,y)}\},$$

$$M_{feature} = \{m_{f(x,y)}\},$$

$$m_{(x,y)} = \{m_{g(x,y)}, m_{f(x,y)}\},$$

$$m_{f(x,y)} = \{f(x,y,z_1), f(x,y,z_2), \ldots, f(x,y,z_n)\},$$

wherein $f(x,y,z)$ is a feature at $(x,y,z)$.

Figure 6:
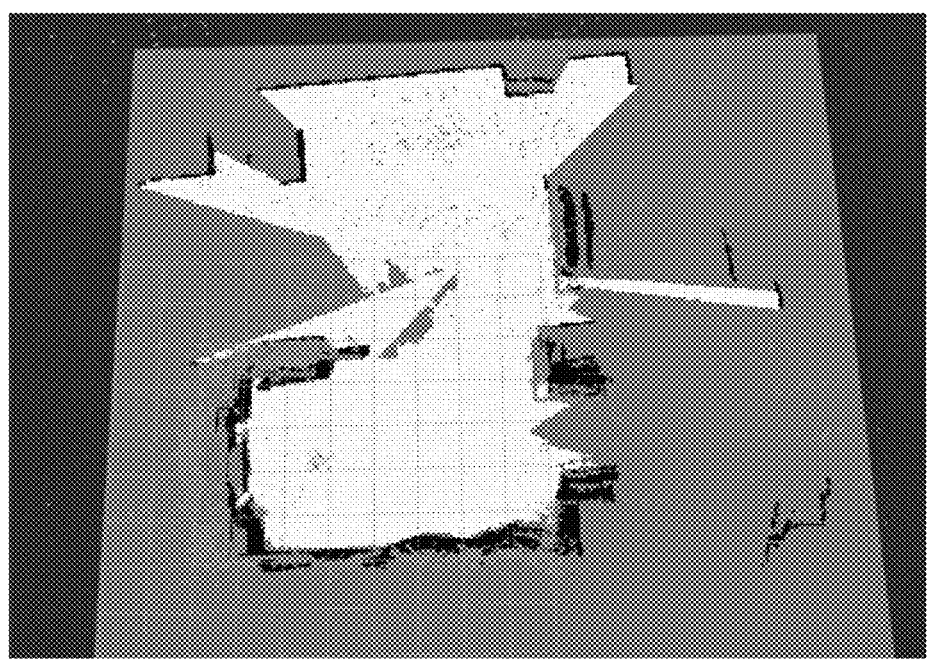
FIG. 6 is a schematic diagram of a 2.5D map in the present embodiment.

In the present embodiment, as shown in FIG. 6, on the established 2.5D map, feature points are distributed above a two-dimensional grid map and share a coordinate system with a grid occupied by laser, a mobile robot model can perform a subsequent navigation control task according to the 2.5D map, an error recovery function can be achieved, and in the process of establishing the map, the map is updated with a gradual exploration of an environment by a mobile robot.

For the update of the visual feature dimension, a feature pose obtained by PnP optimization is incrementally inserted into the map at the front end, the pose of the robot is optimized again at the back end, and an update form of the visual feature dimension is:

$$M_{feature}^{new} = \{M_{feature}^{old}; f_{new}, \xi_f\}.$$

The grid dimension includes an unobserved grid and an observed grid, and for the update of the grid dimension, a laser hit probability $p_{hit}$ or $p_{miss}$ is directly given to the unobserved grid, and an update form of the observed grid is:

$$\mathrm{odds}(p) = \frac{p}{1-p},$$

$$M_{grid}^{new}(x) = \mathrm{odds}^{-1}\left(\mathrm{odds}(M_{grid}^{old}(x)) \cdot \mathrm{odds}(p_{hit/miss})\right).$$

The above-mentioned embodiments are merely illustrative of the technical concepts and features of the present invention, and are intended to enable those skilled in the art to understand the contents of the present invention and implement the present invention, and not to limit the scope of the present invention. All equivalent changes or modifications made according to the spirit of the present invention are intended to be covered by the protection scope of the present invention.

What is claimed is:

1. A vision-and-laser-fused 2.5D map building method, comprising:

S1: calculating inter-image frame transformation according to an RGB-D image sequence to establish a visual front-end odometer;

S2: taking a visual front-end initial estimation as an initial value of scanning matching, and performing laser front-end coarse-grained and fine-grained searches;

S3: performing loop closure detection, and performing back-end global optimization on a 2.5D map according to a detected closed loop; and S4: performing incremental update on visual feature dimensions of the 2.5D map, and performing occupation probability update on grid dimensions, wherein in S2, the matching comprises:

(1) obtaining a pose initial estimation $\xi_0$ according to RGB-D VO; and (2) after a search in a coarse-grained space, reducing a search range, and then searching in a fine-grained space to obtain an optimal pose $\xi^*$; and wherein the search space for the scanning matching is defined as:

$$W=\{\xi_0+(rj_x, rj_y, \delta_\theta j_\theta):(j_x, j_y, j_\theta) \in \overline{W}\},$$

wherein $$\overline{W} = \{-w_x, \ldots, w_x\} \times \{-w_y, \ldots, w_y\} \times \{-w_\theta, \ldots, w_\theta\},$$

$$w_x = \frac{W_x}{r}, w_y = \frac{W_y}{r}, w_\theta = \frac{W_\theta}{\delta_\theta},$$

$\xi_0$ is obtained by an RGB-D odometer, $\{W_x, W_y, W_\theta\}$ is a search upper and lower bound parameter, $\{r, \delta_0\}$ is a step parameter.

2. The vision-and-laser-fused 2.5D map building method according to claim 1, wherein in S1, the inter-frame transformation comprises:

(1) extracting an ORB feature of each image frame on the time sequence, and establishing a corresponding feature matching relationship; and (2) taking a previous frame as a reference frame, performing PnP calculation on a current frame and the reference frame, building a least square problem according to a minimized reprojection error, and performing iterative optimization solving to obtain inter-frame pose transformation.

3. The vision-and-laser-fused 2.5D map building method according to claim 2, wherein the least square problem is:

$$\xi^* = \operatorname*{argmin}_{\xi} \frac{1}{2} \sum_{i=1}^{n} \left\| p_i - \frac{1}{s_i} K\exp(\xi^\wedge) P_i \right\|_2^2,$$

wherein $\xi$ is the camera pose, and

K is a camera internal reference.

4. The vision-and-laser-fused 2.5D map building method according to claim 2, wherein the ORB feature extraction method is an open-source framework ORB_SLAM method.

5. The vision-and-laser-fused 2.5D map building method according to claim 1, wherein in S2, a scan-to-map matching mode is adopted in laser front-end scanning matching.

6. The vision-and-laser-fused 2.5D map building method according to claim 1, wherein the optimal pose $\xi^*$ is:

$$\xi^* = \operatorname*{argmax}_{\xi \in W} \sum_{k=1}^{K} M(T_\xi h_\xi),$$

wherein $T_\xi$ is transformation of a scanning point into a map coordinate system, $h_k$ is a set of scanning points of a laser beam.

7. The vision-and-laser-fused 2.5D map building method according to claim 1, wherein in S3, the loop closure detection comprises a constraint between nodes and a constraint between the nodes and a local map, and the loop closure detection comprises:

(1) performing a breadth optimization search within a certain range with a current node as a search center, so as to obtain nodes associated with the current node, generating a data chain using the nodes, performing matching on the current node, and if a response value reaches a set threshold, establishing a constraint $\xi_{ij}$ between the current node and a node in the data chain closest to a centroid of the current node; and (2) in a map building process, taking a certain number of accumulated laser data chains within a certain distance from the current node as the local map, the constraint $\xi_{im}$ between the laser frame and the map being formed between the node and the current local map.

8. The vision-and-laser-fused 2.5D map building method according to claim 1, wherein in S3, an optimization formula of the back-end global optimization is:

$$\operatorname*{argmin}_{\Pi_s, \xi_m} \frac{1}{2} \left( \sum_{ij} \rho\left(E^2\left(\xi_i, \xi_j; \sum\nolimits_{ij}, \xi_{ij}\right)\right) + \sum_{i} \rho\left(E^2\left(\xi_i, \xi_m; \sum\nolimits_{im}, \xi_{im}\right)\right) \right),$$

wherein $$E^2\left(\xi_i, \xi_j; \sum\nolimits_{ij}, \xi_{ij}\right) = e(\xi_i, \xi_j; \xi_{ij})^T \sum\nolimits_{ij}^{-1} e(\xi_i, \xi_j; \xi_{ij}),$$

$$e(\xi_i, \xi_j; \xi_{ij}) = \xi_{ij} - \begin{pmatrix} R_{\xi_i}^{-1}(t_{\xi_i} - t_{\xi_j}) \\ \xi_{i;\theta} - \xi_{j;\theta} \end{pmatrix},$$

$$E^2\left(\xi_i, \xi_m; \sum\nolimits_{im}, \xi_{im}\right) = e(\xi_i, \xi_m; \xi_{im})^T \sum\nolimits_{im}^{-1} e(\xi_i, \xi_m; \xi_{im}),$$

$$e(\xi_i, \xi_m; \xi_{im}) = \xi_{im} - \begin{pmatrix} R_{\xi_i}^{-1}(t_{\xi_i} - t_{\xi_m}) \\ \xi_{i;\theta} - \xi_{m;\theta} \end{pmatrix},$$

$$\rho(e) = \begin{cases} \frac{1}{2}e^2 & , |e| \leq \delta \\ \delta\left(|e| - \frac{1}{2}\delta\right) & , |e| > \delta \end{cases},$$

$\Pi_s = \{\xi_i\}_{i=1, \ldots, n}$ is a node set, $\xi_m$ is a pose of the local map, $\xi_{ij}$ is the constraint between the nodes, and $\xi_{im}$ is the constraint between the node and the local map.

9. The vision-and-laser-fused 2.5D map building method according to claim 1, wherein in S4, the 2.5D map is $M=\{m_{(x,y)}\}$, the 2.5D map comprises a laser grid map $M_{grid}=\{m_{g(x,y)}\}$ and a visual feature map $M_{feature}=\{m_{f(x,y)}\}$, and the 2.5D map $M=\{m_{(x,y)}\}$ is:

$$m_{(x,y)} = \{m_{g(x,y)}, m_{f(x,y)}\},$$

$$m_{f(x,y)} = \{f(x,y,z_1), f(x,y,z_2), \ldots, f(x,y,z_n)\},$$

wherein f(x,y,z) is a feature at (x,y,z).

10. The vision-and-laser-fused 2.5D map building method according to claim 1, wherein for the update of the visual feature dimension, a feature pose obtained by PnP optimization is incrementally inserted into the map at the front end, the pose of the robot is optimized again at the back end, and an update form of the visual feature dimension is:

$$M_{feature}^{new} = \{M_{feature}^{old}; f_{new}, \xi_f\}.$$

11. The vision-and-laser-fused 2.5D map building method according to claim 1, wherein the grid dimension comprises an unobserved grid and an observed grid,
a laser hit probability $p_{hit}$ or $p_{miss}$ is directly given to the unobserved grid, and
an update form of the observed grid is:

$$\text{odds}(p) = \frac{p}{1-p},$$
$$M_{grid}^{new}(x) = \text{odds}^{-1}\left(\text{odds}\left(M_{grid}^{old}(x)\right) \cdot \text{odds}(p_{hit/miss})\right).$$

12. A vision-and-laser-fused 2.5D map building method, comprising:
S1: calculating inter-image frame pose transformation according to an RGB-D image sequence to establish a visual front-end odometer, the calculating inter-frame pose transformation comprising:
(1) extracting an ORB feature of each image frame on the time sequence, and establishing a corresponding feature matching relationship; and
(2) taking a previous frame as a reference frame, performing PnP calculation on a current frame and the reference frame, building a least square problem according to a minimized reprojection error, and performing iterative optimization solving to obtain inter-frame pose transformation, the least square problem being:

$$\xi^* = \arg\min_{\xi} \frac{1}{2} \sum_{i=1}^{n} \left\| p_i - \frac{1}{s_i} K \exp(\xi^{\wedge}) P_i \right\|_2^2,$$

wherein
$\xi$ is the camera pose, and
K is a camera internal reference;
S2: taking a visual front-end initial estimation as an initial value of scanning matching, and performing laser front-end coarse-grained and fine-grained searches, a scan-to-map matching mode being adopted in laser front-end scanning matching and comprising:
(1) obtaining a pose initial estimation $\xi_0$ according to RGB-D VO; and
(2) after a search in a coarse-grained space, reducing a search range, and then searching in a fine-grained space to obtain an optimal pose $\xi^*$:

$$\xi^* = \arg\max_{\xi \in W} \sum_{k=1}^{K} M(T_{\xi} h_{\xi}),$$

wherein
$T_{\xi}$ is transformation of a scanning point into a map coordinate system,
$h_k$ is a set of scanning points of a laser beam;
S3: performing loop closure detection, and performing back-end global optimization on a 2.5D map according to a detected closed loop, the loop closure detection comprising:

(1) performing a breadth optimization search within a certain range with a current node as a search center, so as to obtain nodes associated with the current node, generating a data chain using the nodes, performing matching on the current node, and if a response value reaches a set threshold, establishing a constraint $\xi_{ij}$ between the current node and a node in the data chain closest to a centroid of the current node; and
(2) in a map building process, taking a certain number of accumulated laser data chains within a certain distance from the current node as the local map, the constraint $\xi_{im}$ between the laser frame and the map being formed between the node and the current local map, and an optimization formula of the back-end global optimization being:

$$\arg\min_{\Pi_s, \xi_m} \frac{1}{2} \left( \sum_{ij} \rho\left(E^2\left(\xi_i, \xi_j; \sum_{ij}, \xi_{ij}\right)\right) + \sum_{i} \rho\left(E^2\left(\xi_i, \xi_m; \sum_{im}, \xi_{im}\right)\right) \right),$$

wherein $$E^2\left(\xi_i, \xi_j; \sum_{ij}, \xi_{ij}\right) = e(\xi_i, \xi_j; \xi_{ij})^T \sum_{ij}^{-1} e(\xi_i, \xi_j; \xi_{ij}),$$

$$e(\xi_i, \xi_j; \xi_{ij}) = \xi_{ij} - \begin{pmatrix} R_{\xi_i}^{-1}(t_{\xi_i} - t_{\xi_j}) \\ \xi_{i;\theta} - \xi_{j;\theta} \end{pmatrix},$$

$$E^2\left(\xi_i, \xi_m; \sum_{im}, \xi_{im}\right) = e(\xi_i, \xi_m; \xi_{im})^T \sum_{im}^{-1} e(\xi_i, \xi_m; \xi_{im}),$$

$$e(\xi_i, \xi_m; \xi_{im}) = \xi_{im} - \begin{pmatrix} R_{\xi_i}^{-1}(t_{\xi_i} - t_{\xi_m}) \\ \xi_{i;\theta} - \xi_{m;\theta} \end{pmatrix},$$

$$\rho(e) = \begin{cases} \frac{1}{2} e^2 & , |e| \leq \delta \\ \delta\left(|e| - \frac{1}{2}\delta\right) & , |e| > \delta \end{cases},$$

$\Pi_s = \{\xi_i\}_{i=1,\ldots,n}$ is a node set,
$\xi_m$ is a pose of the local map,
$\xi_{ij}$ is the constraint between the nodes, and
$\xi_{im}$ is the constraint between the node and the local map; and
S4: performing incremental update on visual feature dimensions of the 2.5D map, and performing occupation probability update on grid dimensions,
the 2.5D map being $M = \{m_{(x,y)}\}$, the 2.5D map comprising a laser grid map $M_{grid} = \{m_{g(x,y)}\}$ and a visual feature map $M_{feature} = \{m_{f(x,y)}\}$, and the 2.5D map $M = \{m_{(x,y)}\}$ being:

$$m_{(x,y)} = \{m_{g(x,y)}, m_{f(x,y)}\},$$

$$m_{f(x,y)} = \{f(x,y,z_1), f(x,y,z_2), \ldots, f(x,y,z_n)\},$$

wherein
$f(x,y,z)$ is a feature at $(x,y,z)$;
an update form of the visual feature dimension being:

$$M_{feature}^{new} = \{M_{feature}^{old}; f_{new}, \xi_f\},$$

the grid dimension comprising an unobserved grid and an observed grid, and a laser hit probability $p_{hit}$ or $p_{miss}$ being directly given to the unobserved grid, and an update form of the observed grid being:

$$\text{odds}(p) = \frac{p}{1-p},$$

$$M_{grid}^{new}(x) = \text{odds}^{-1}\left(\text{odds}\left(M_{grid}^{old}(x)\right) \cdot \text{odds}(p_{hit/miss})\right).$$

* * * * *